Oct. 20, 1959  V. WEBER ET AL  2,909,324
THERMOSTATIC VALVE CONTROL
Filed Sept. 16, 1957  3 Sheets-Sheet 3
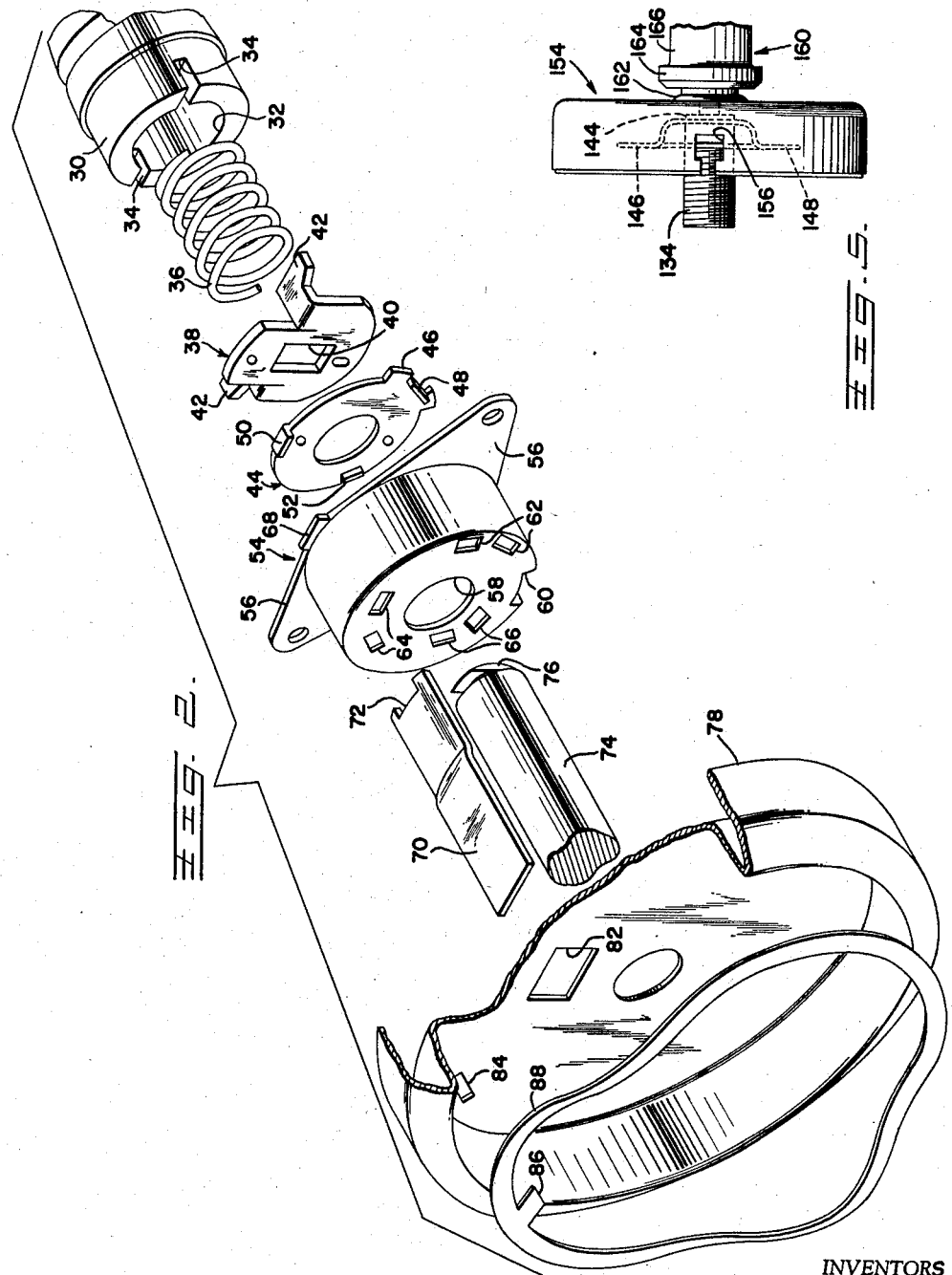
INVENTORS
VICTOR WEBER
CHARLES D. BRANSON
FRANCIS S. GENBAUFFE
BY  Albert J. Henderson
ATTORNEY

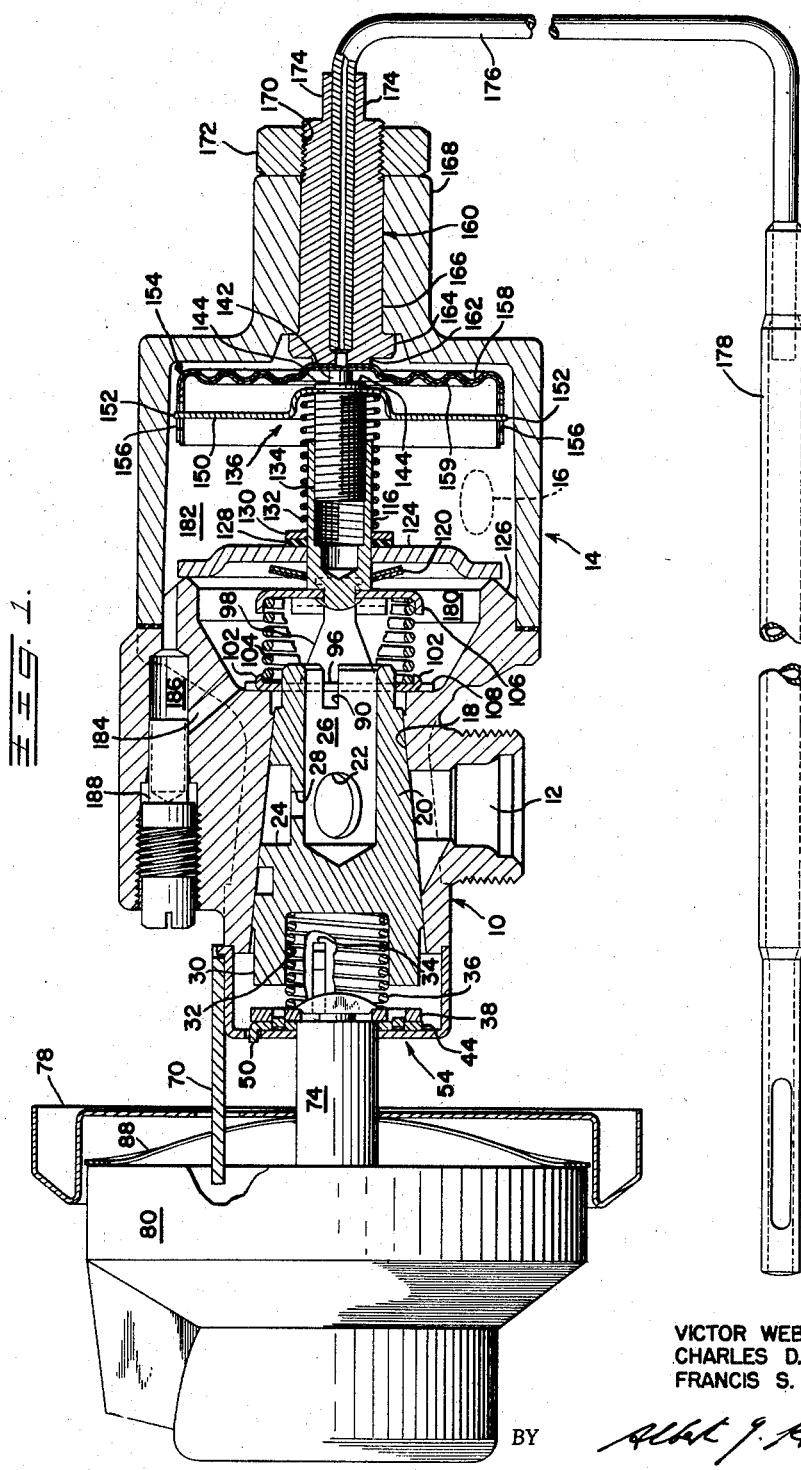

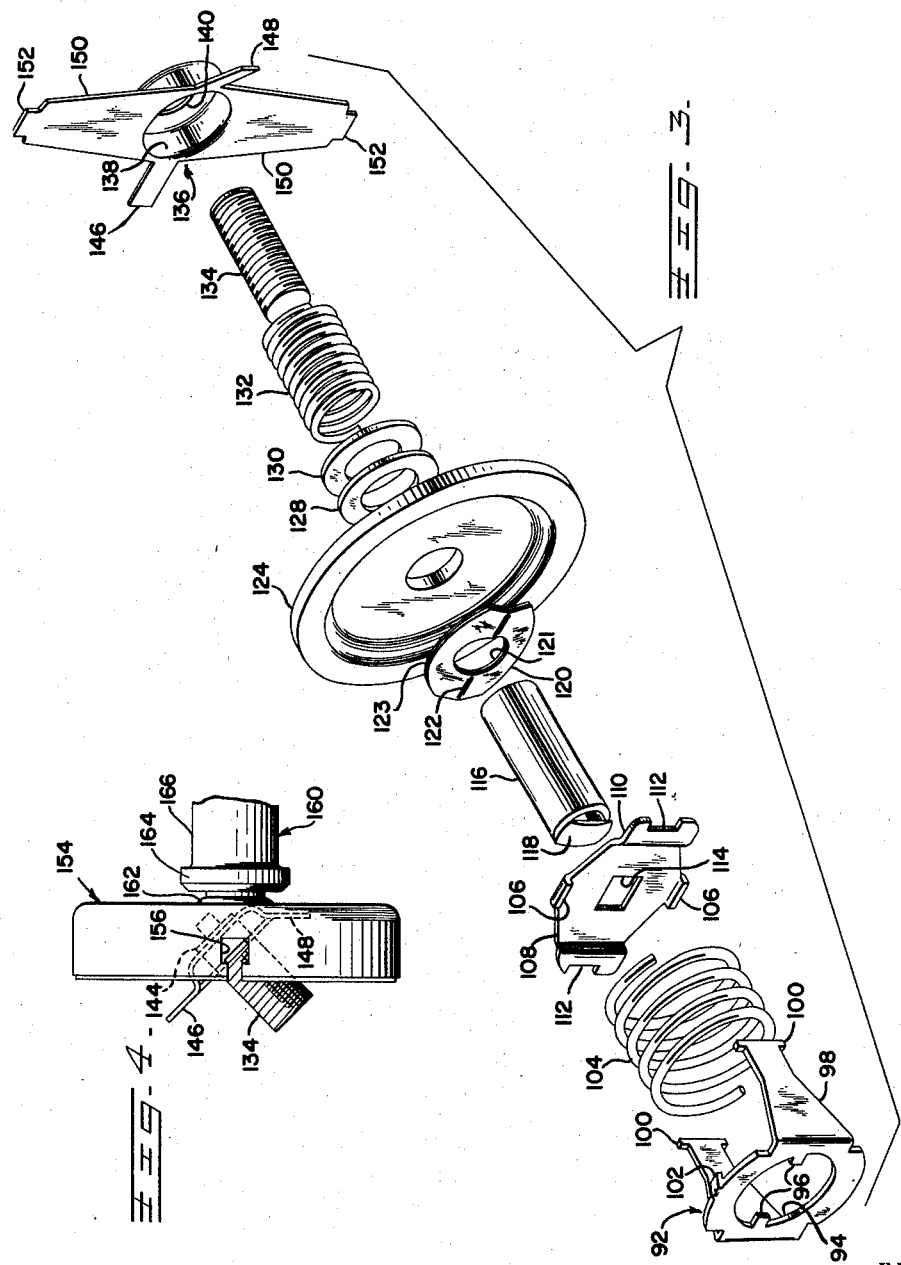

United States Patent Office 2,909,324
Patented Oct. 20, 1959

2,909,324

THERMOSTATIC VALVE CONTROL

Victor Weber and Charles D. Branson, Greensburg, and Francis S. Genbauffe, Irwin, Pa., assignors to Robertshaw-Fulton Controls Company, Greensburg, Pa., a corporation of Delaware Application September 16, 1957, Serial No. 684,277

5 Claims. (Cl. 236—99)

This invention relates to flow control devices and more particularly to a combined gas cock and valve for controlling and regulating thermostatically a flow of gaseous fuel to a burner.

An object of this invention is to position a thermal element in a thermostatic valve for direct ambient compensation thereof.

It is another object of this invention to utilize a bimetal compensating element for orienting and maintaining the alignment of a movable valve member relative to its valve seat.

Another object of this invention is to prevent shifting of the cooperating elements of the temperature adjusting means in a thermostatic valve.

This invention has another object in that calibration of the temperature adjusting means of a thermostatic valve is accomplished externally.

An additional object of this invention is to facilitate assembly of the valve adjusting means with the valve regulating means of a thermostatic valve.

This invention is particularly applicable, although not limited, to the combination of a rotary shut-off cock and a reciprocable disc valve which is operable automatically by thermo-responsive means to maintain a predetermined temperature in an appliance such as the oven of a gas range. In the preferred construction, a bimetallic disc biases a valve member in one direction to compensate for any movement by the thermo-responsive means in the opposite direction due to ambient temperatures.

Other objects and advantages will become apparent from the following description taken in connection with the accompanying drawing wherein:

Fig. 1 is a side elevation, partly in section, of a thermostatic valve control embodying this invention;

Fig. 2 is an exploded perspective view of the shut-off cock mechanism;

Fig. 3 is an exploded perspective view of the valve mechanism;

Fig. 4 is a top plan view showing the initial step in assembling the temperature adjusting means; and Fig. 5 is a view similar to Fig. 4 showing the temperature adjusting means in its assembled position.

As is illustrated in Fig. 1, the thermostatic valve includes a main casing 10 having an inlet 12 and an end casing 14 having an outlet 16. The two casings are secured together by any suitable means (not shown) to form a sealed housing. The open end of casing 10 is provided with a tapered valve seat 18 which receives a hollow shut-off cock or valve member 20 having a correspondingly tapered surface. A pair of oppositely disposed ports 22 (only one being shown) in the hollow valve member 20 are connected by an arcuate groove 24 to permit a flow of gas from inlet 12 to the internal bore 26 of the valve member 20. A small aperture 28 is provided in the side wall of the valve member 20 defined by the groove 24 midway between the ports 22 to facilitate the flow of gas in certain positions of the valve member 20.

A cylindrical valve stem 30, extending from the valve member 20 through the opening in casing 10, is centrally bored at 32 and has a pair of oppositely disposed slots 34 located on a chord across its outer end. A coil spring 36 is mounted in compression between the bottom of the central bore 32 and a valve drive member 38 which is provided with a central rectangular opening 40. A pair of oppositely disposed lugs 42 (Fig. 2) are bent perpendicularly from the drive member 38 and fit into the slots 34 on the valve stem 30. A lock plate 44 is integrated with drive member 38 by any suitable means, such as welding, for rotation therewith. Lock plate 44 is in the form of an annulus and has a radial extension 46 protruding from its outer circumference. Three angularly spaced lugs 48, 50, and 52 are bent perpendicularly from the plate 44 and are offset from each other in a plane defined by the radius of the plate 44. The outermost lug 48 is located on the extension 46, the intermediate lug 50 is located on the circumference of plate 44, and the innermost lug 52 is spaced inwardly from the circumference of plate 44.

A generally cup-shaped shaft guide, indicated generally at 54, has a pair of oppositely disposed mounting flanges 56 for mounting the guide on the main casing 10 to cover the open end thereof. The bottom wall of the cup-shaped guide 54 has a central shaft aperture 58. A portion of the cylindrical wall adjacent the bottom wall of cup-shaped guide 54 is bent inwardly to form a stop projection 60 for cooperation with the extension 46 on plate 44. Three pairs of angularly spaced slots 62, 64, and 66 are formed in the bottom wall of cup-shaped guide 54 and are offset from each other in the same manner as the lugs on plate 44 so that the pairs of slots 62, 64, and 66 receive the lugs 48, 50, and 52, respectively, of the plate 44 for a purpose to be described hereinafter. A rectangular projection 68 is formed on the external wall of cup-shaped member 54 intermediate of the mounting flanges 56. An elongated rectangularly shaped key 70 has a notched end 72 which cooperates with projection 68 to locate the key on the cup-shaped guide 54. Although shown separated in Fig. 2, the key 70 in use is secured to the external periphery of cup-shaped guide 54 by any suitable means, such as welding.

A shaft 74 has one end extending through aperture 58 of the cup-shaped guide member 54 and the annular plate 44 and has a necked down rectangular end 76 which extends through the rectangular opening 40 in guide member 38 to form a drive connection therewith. The other end of shaft 74 extends through a central aperture in the recessed portion of a bezel 78 and provides a mounting means for a dial 80, the inner portion of which is disposed within such recessed portion. Dial 80 is secured to shaft 74 by any suitable means, such as a set screw (not shown), so that rotation of the dial 80 causes unitary rotation of shaft 74, locking plate 44 and drive member 38. A rectangular opening 82 in the bezel 78 receives the free end of key 70 for the alignment of bezel 78 and to prevent rotation thereof with shaft 74. A second rectangular opening 84 in bezel 78 receives a lug 86 extending from a corrugated resilient ring 88 which is positioned between the bezel 78 and dial 80 for biasing the bezel 78 against a panel (not shown) on which it may be mounted. Any type of suitable indicia (not shown) may be used on the dial 80 or bezel 78 to indicate appropriate temperature settings.

The internal end of valve member 20 is provided with a pair of oppositely disposed slots 90 located on a chord across its inner end. As is illustrated in Fig. 3, a generally U-shaped drive bracket, indicated generally at 92, has a central opening in its bottom portion for mounting on the inner end of valve member 20. A pair of oppositely disposed lugs 96 extend into the opening 94 and are fitted into the oppositely disposed slots 90 in the valve member 20 for rotation therewith. The U-shaped drive bracket 92 has a pair of tapering legs 98 each of which has a rectangular portion terminating in a T-shaped configuration 100. A pair of spring retaining lugs 102 extend perpendicularly from the U-shaped bracket 92 intermediate the legs 98 respectively. A coil spring 104 has one end mounted between the projections 102 and its other end mounted between similar projections 106 perpendicularly bent from a drive plate 108. Drive plate 108 has a generally rectangular configuration, the sides of which are offset at 110 and are notched at 112 to receive the T-shaped extension 100 of the drive bracket 92. The center portion of drive plate 108 is provided with a rectangular opening 114 for the reception of a necked down rectangular end 118 formed on a cylindrical center post 116 as a driving connection. A bimetal disc 120 has a central aperture 121 for mounting on the centerpost 116 adjacent drive plate 108. As shown more clearly in Fig. 3, the bimetal disc 120 has a generally oval configuration and is bent along its longitudinal axis 122 to form a substantially V-shaped cross-section. Bimetal disc 120 abuts drive plate 108 and has line contact therewith along its longitudinal axis 122. The opposed edges of V-shaped disc 120 have an arcuate configuration 123 for abutting an annular valve member 124 with a two-point contact perpendicular to the longitudinal axis of bimetal disc 120. Such a construction of bimetal disc 120 permits valve member 124 to orient itself at closure and to maintain its alignment by slight pivotal action about the longitudinal axis 122 of disc 120.

Valve member 124 is disposed on center post 116 and cooperates with an annular valve seat 126 formed on the inner end of main casing 10. An annular gasket 128 is mounted on center post 116 and abuts the rear face of valve member 124 to seal against leakage between these members. A washer 130 maintains such seal in response to a spring force exerted by a coil spring 132 which encircles center post 116 with one end engaging the washer 130 and thus biases the washer 130 against the gasket 128. A stud 134 has one end threaded into a threaded bore of center post 116 and its opposite end extending through a spider plate 136.

The center of spider plate 136 is circularly recessed to form a cup-shaped housing 138 which has a central aperture 140 in the bottom thereof. The housing 138 receives the opposite end of coil spring 132 to retain the same under compression. By means of the central aperture 140, the spider plate 136 is mounted adjacent the end 142 of threaded stud 134 for rotation therewith by fastening flanges 144 (only two being shown in Fig. 1) which are bent from housing 138 to the stud 134 by any suitable means such as rivets (not shown). An arm 146 (Fig. 4) extends from one side of housing 138 and an oppositely disposed arm 148 extends from the other side but is bent outwardly from the plane of the spider plate 136. A pair of oppositely disposed legs 150 extend perpendicularly to arm 146 from the housing 138. The sides of each leg 150 taper in a decreasing manner to a shouldered tang 152 provided on the end thereof.

An expansible power element, indicated generally at 154, has a substantially cup-shaped configuration. The peripheral edges of cup-shaped member 154 are provided with a pair of oppositely disposed, elongated T-shaped slots 156 which receive the shouldered tangs 152 of the spider plate for longitudinal movement therein. The expansible power element 154 consists of a pair of nested corrugated discs 158 and 159 having their peripheral edges welded together. The inner end of a stud 160 is welded at 162 or otherwise secured to the central portion of the outer disc 158. The expansible power element 154 is of the hydraulic type and the stud 160 and outer disc 158 are suitably bored to permit a fluid to enter between the discs 155 and 159 and force them apart. The stud 160 is provided with a head portion which abuts an inner wall of end housing 14 and a rod-like portion 166 which extends through a centrally bored boss 168 extending from the rear of end housing 14.

The exposed end of rod portion 166 is threaded at 170 to receive a lock nut 172 which secures the stud 160 adjustably to end housing 14. The reduced end portion of rod portion 166 is provided with a pair of opposed flattened portions 174 which receive an appropriate tool for rotating stud 160 relative to lock nut 172 upon the latter being loosened and held against rotation. A capillary tube 176 has one end secured in the central bore of stud 160 and its opposite end connected to a temperature sensing bulb 178 which is positioned in the space to be heated.

The expansible power element 154, the stud 160, the capillary tube 176 and the thermal sensing bulb 178 constitute the thermally responsive means which is a closed system filled with an expansible substance so that a variation of temperature sensed by the thermal sensing bulb 178 produces a corresponding expansion or contraction of power element 154 as described.

The regulating valve assembly is disposed within a chamber which is divided into an inlet chamber 180 and an outlet chamber 182 by the valve seat 126 and valve 124. A small bore 184 establishes communication between inlet chamber 180 and a by-pass passage 186 that is connected to outlet chamber 182. A flow restrictor 188 is axially adjustable within the by-pass passage 186 to vary the flow therethrough according to predetermined conditions.

In order to place the thermostatic control device in operation, the dial 80 and shaft 74 are depressed against the bias of coil spring 36 whereby lugs 48, 50, and 52 are disengaged from the first of their respective slots 62, 64, and 66. While in its depressed condition, the dial 80 is rotated and the lugs 48, 50, and 52 pass over the second of their respective slots 62, 64, and 66, and continued rotation is not hindered because the offset arrangement of the lugs and slots preclude further interlocking during counterclockwise rotation. Rotation of dial 80 to a desired temperature setting causes rotation of the hollow valve member 20 by means of lugs 42 on drive member 38 so that one of the ports 22 registers with inlet 12.

The rotary motion of valve member 20 is transmitted to drive bracket 92 which in turn rotates drive plate 108 by means of the notched connections at 112. Through its drive connection at 118, center post 116 rotates simultaneously with drive plate 108 whereby center post 116 is further threaded on the stud 134 which is prevented from rotating by being fixed to spider plate 136; thus dial 80, shaft 74, drive member 38, tapered valve 20, and drive bracket 92 rotate as a unit to constitute the adjusting means for the regulating valve 124. The unitary rotary motion of the actuating means is converted to axial movement for the regulating valve 124 by means of the described operable connection therebetween. Thus, regulating valve 124 being operably connected to its actuating means by the center post 116 which is threaded on stud 134 and which is connected to drive plate 108 for rotation therewith, as the center post 116 is rotated further on the stud 134, coil spring 104 biases drive plate 108 axially away from drive bracket 92 along the rectangular ends of legs 98. It is apparent that regulating valve 124 can be adjusted by relative rotation of center post 116 and stud 134 to any desired temperature.

In order that the thermostatically controlled device be responsive solely to the remote temperature sensed by bulb 178, the bimetal compensating disc 120 is constructed to compensate for any movement of power element 154 that is due to ambient temperatures in the vicinity of the housing. Because of the bias exerted on the rear face of valve member 124 by coil spring 132, the bimetal disc 120 rests firmly against drive plate 108 along its longitudinal axis 122 and abuts the front face of valve member 124 at its top and bottom arcuate edges 123; a rise in ambient temperatures causes the bimetal 120 to flex about its axis 122. During this movement, coil spring 132 is compressed slightly between washer 130 and spider cup 138.

When the temperature of the space being heated as sensed by bulb 178 reaches that for which the dial 80 has been set, the power element 154 will expand against the stud end 142 causing spider plate 150, stud 134, center post 116, and valve member 124 to move to the left as viewed in Fig. 1. This closes valve member 124 on its seat 126 and cuts off the flow of fluid to the outlet port 16. As is well known in the art, by-pass 186 provides means to maintain a minimum flame at the burner while the regulating valve member is closed in response to thermostatic action.

It is apparent from the relative sizes and designs of the load spring 104 and the overtravel spring 132 as viewed in Fig. 1, that the load spring 104 exerts several times the force of overtravel spring 132. Consequently, the threaded connection between center post 116 and stud 134 which form the temperature adjusting means is continually under compression to eliminate any play between these two members. When regulating valve member 123 goes into overtravel, due to over expansion of power element 154, the force on this threaded connection does not change from tension to compression which would permit possible shifting, but rather there is a continual compression force exerted by load spring 104.

When it is desired to turn off the thermostatic control device, the dial 80 is rotated clockwise to its off position. During such rotation, the coil spring 36 biases lugs 48, 50, and 52 against the bottom wall of cup-shaped guide 54 and subsequently into the second of their respective slots 63, 64, and 66 which serve as a safety stop to prevent complete turnoff accidentally. In this position, the shut-off cock 20 remains slightly open to provide a small flow of fluid to the outlet port 16 through the bypass passage 186 so that the flame at the main burner will not be extinguished by accidental rotation of dial 80 to a lower temperature setting. Should it be desired that the thermostatic control device be turned off completely, dial 80 must be again depressed to disengage lugs 48, 50, and 52 from the second of their respective slots 62, 64, and 66 and then rotated clockwise to a point where projection 46 on lock plate 44 engages a stop projection 60 on cup-shaped guide member 54; at this point, coil spring 36 biases lugs 48, 50, and 52 into the first of their respective slots 62, 64, and 66. The three lugs 48, 50, and 52 are offset from each other and are utilized to guide the rotary motion of shaft 74 in the aperture 58 of cup-shaped guide member 54. Three pairs of cooperating slots are utilized to maintain the shaft alignment and to prevent accidental shearing of shaft 74.

Calibration of the thermostatic control device is readily performed by appropriate tools applied to lock nut 172 and the flattened portions 174 of stud 160. The stud 160 is then rotated relative to lock nut 172 and the casing boss 168. Such rotation is transmitted to the tangs 152 on the spider legs 150 by means of the slots 156 in the peripheral edges of power element 154, and the fixed connection between the stud 134 and the spider plate 136 causes rotation of the stud 134 within the center post 116. Any suitable type of indicia may be utilized to indicate the number of degrees of alteration which have been made in the temperature at which the calibrated device will operate.

As is illustrated in Fig. 4, the assembly of spider plate 136 within the cup-shaped power element 154 is facilitated by the outwardly bent arm 148. The bent arm 148 permits spider plate 136 to be assembled by tilting it at the appropriate angle and then passing tangs 152 into the T-shaped slots 156 on the peripheral edges of power element 154. After the tangs 152 engage slots 156, the spider plate 136 and the attached stud 134 are returned from a tilted position and the arm 148 is bent flat into the same plane as spider arm 146. With spider arms 146 and 148 positioned in the same plane as viewed in Fig. 5, the tangs 152 cannot become disengaged from slots 156 and the power element 154.

Only one embodiment of this invention has been presented herein and inasmuch as such invention is subject to many variations, modifications, and reversal of parts, it is intended that all matter contained in the above description of this embodiment shall be interpreted as illustrative and not in a limiting sense.

We claim:

1. In a thermostatic control device, the combination comprising a housing having an inlet and an outlet separated by a valve seat, a regulating valve member engageable with the valve seat, a mounting post operatively connected to said regulating valve member and extending therethrough with opposite ends disposed on opposite sides thereof, a drive plate secured to one of the ends of said mounting post for rotation therewith, a stud member adjustably connected to the other end of said mounting post, thermally responsive means having a power element in abutting relation with said stud member causing movement of said stud member and said mounting post to operate said regulating valve member in response to temperature variations, manually operable means connected to said drive plate to position selectively said regulating valve member relative to said valve seat, and a bimetal disc having a pair of arcuate edges extending from its longitudinal axis to form a generally V-shaped cross section, said bimetal disc being mounted on said mounting post with its longitudinal axis abutting said drive plate and its arcuate edges abutting said regulating valve member to provide a pivotal action therefor when said regulating valve member engages said valve seat.

2. In a thermostatic control device, the combination comprising a housing having an inlet and an outlet separated by a valve seat; an annular valve member engageable with the valve seat to regulate a flow of fluid to the outlet; a cylindrical mounting post extending through said valve member with a drive end on one side thereof and a threaded end on the other side thereof; actuating means for said valve member including a drive plate fixed to the drive end of said post, a drive bracket having leg portions slidably connected to the drive plate, and a load spring mounted in compression between the drive bracket and the drive plate to exert a compressive force on said post; a threaded stud adjustably connected to the threaded end of said post; thermally responsive means having a power element in abutting relation with said stud causing movement of said stud and said post against the bias of said load spring to operate said valve member in response to temperature variations; spring retaining means fixedly secured to said stud; and an overtravel spring having one end engaging said spring retaining means and an opposite end biasing said valve member towards the drive plate, said overtravel spring being of a smaller size than said load spring so that said load spring exerts a continual compressive force on said post to eliminate shifting thereof relative to said stud.

3. The combination as recited in claim 2 wherein said spring retaining means comprises a spider plate having oppositely disposed legs, an interlocking connection between each of said legs and said power element whereby said spider plate and said stud are rotatable by said power element relative to said post to calibrate the operation of said valve member.

4. In a thermostatic control device, the combination comprising a housing having inlet and outlet ports, a tapered valve seat in said housing adjacent the inlet port, a tapered valve member in said housing coacting with said valve seat and having a fluid passage adapted to register with the inlet port, a valve operator extending exteriorly of said housing and being connected to said tapered valve member to move the same in said tapered valve seat, a substantially U-shaped drive bracket having leg portions and having a base portion attached to said tapered valve member for rotation therewith, a drive plate slidably mounted on the leg portions of said drive bracket for rotation therewith, a center post having one end with an internally threaded bore and an opposite end fixed to said drive plate for rotation therewith, a bimetal disc mounted on said center post adjacent the said opposite end thereof and having a portion engaging said drive plate, an annular regulating valve member mounted on said center post to abut said bimetal disc, an annular gasket and washer mounted on said center post to abut said regulating valve member, a threaded stud having an exposed end and an opposite end adjustably positioned within the threaded bore of said center post, a spider plate having oppositely disposed legs and a center portion fixed to said threaded stud adjacent its exposed end, a coil spring mounted in compression between said washer and the center portion of said spider plate to bias said regulating valve member against said bimetal disc, thermally responsive means having a power element abutting the exposed end of said threaded stud causing movement of said regulating valve member in response to temperature variations, and an operable connection between the legs of said spider plate and the power element whereby said threaded stud can be rotated in said center post only to calibrate said regulating valve member.

5. In a thermostatic control device, a housing having an inlet and an outlet, an annular valve seat formed in said housing between the inlet and the outlet, an annular valve member cooperable with said valve seat to regulate a flow of fluid to the outlet, temperature adjusting means including a relatively movable post member being operatively connected to and extending through said valve member and including a relatively fixed stud member cooperating with the post member, adjusting means operatively connected to the post member for moving the same relative to the stud member whereby said valve member is positioned to a selected temperature adjustment, a bimetal disc mounted on the post member in engagement with said valve member to compensate for ambient temperatures surrounding said housing, and thermally responsive means having a power element in abutting relation with the stud member causing movement of the stud member and the post member to operate said valve member in response to temperature variations, said power element comprising a cup-shaped element with a pair of oppositely disposed T slots in its peripheral edge and a spider plate fixedly secured to the stud member and disposed within the cup-shaped element, said spider plate comprising a pair of oppositely disposed legs, a tang on each of said legs fitting into the T slots on the edge of said cup-shaped element, a first arm disposed perpendicularly to said legs, a second arm oppositely disposed to said first arm and extending in an annular plane thereto to facilitate assembly of the tangs on said legs into the T slots on the edge of said cup-shaped element, and said second arm being bendable to a plane coincident with said first arm to prevent the tangs from being disengaged from their respective T slots.

References Cited in the file of this patent

UNITED STATES PATENTS

| | | |
|---|---|---|
| 2,045,289 | Bolin | June 23, 1936 |
| 2,101,735 | Fonseca | Dec. 7, 1937 |
| 2,141,614 | Mott | Dec. 27, 1938 |
| 2,153,886 | Grayson | Apr. 11, 1939 |
| 2,284,496 | Smith | May 26, 1942 |
| 2,295,427 | Puster | Sept. 8, 1942 |
| 2,800,284 | Weber | July 23, 1957 |